Patented July 18, 1950

2,515,595

UNITED STATES PATENT OFFICE 2,515,595

PREPARATION OF 2,4-PENTADIENOIC ACIDS

Bradford P. Geyer, Berkeley, and Seaver A. Ballard, Orinda, Calif., assignors to Shell Development Company, San Francisco, Calif., a corporation of Delaware No Drawing. Application July 20, 1948,
Serial No. 39,817

6 Claims. (Cl. 260—526)

This invention relates to a process for the preparation of diolefinic carboxylic acids. More particularly, the present invention relates to a process for the preparation of 2,4-dienoic acids by reaction effected between a ketene and an alpha-methylene aldehyde.

It unexpectedly has been discovered in accordance with the invention that when a ketene is reacted with an alpha-methylene aldehyde in the presence of certain catalysts, described more fully hereinafter, there is produced as a principal product of the reaction a diolefinic carboxylic acid having the olefinic bonds between carbon atoms Nos. 2 and 3 and Nos. 4 and 5, respectively, of the chain of carbon atoms in which the carbon atom in the No. 1 position is the carbon atom of the carboxyl group. The new reaction which is effected in accordance with the invention may be exemplified by the formation of 2,4-pentadienoic acid by the reaction of acrolein with ketene. However, other alpha-methylene aldehydes may be employed in the process of the invention within exceeding the generic concepts of the invention. The process of the invention is characterized inter alia by the production of the diolefinic carboxylic acid as the principal product of the reaction. The experimental evidence indicates that contrary to what might be expected, there is no appreciable formation of products of side reaction of the character of acid anhydrides, carboxylic acid esters, or like products wherein the carboxyl group is combined, rather than its free, form.

The alpha-methylene aldehydes are those aldehydes which contain at least three carbon atoms and which have a methylene group, that is, a $CH_2=$ group, directly attached to the carbon atom to which the formyl group is bonded. Acrolein is the member of the group with the lowest molecular weight, since it contains only three carbon atoms. It is the preferred member of the group. Other alpha-methylene aldehydes comprise the mono-substituted acroleins substituted at the alpha carbon atom, preferably by a hydrocarbon group, such as an alkyl, cycloalkyl, or aryl group. Illustrative alpha-methylene substituted acroleins include, among others, methacrolein (alpha-methylacrolein), alpha-ethylacrolein, alpha-propylacrolein, alpha-butylacrolein, and alpha-isobutylacrolein. Alpha-pentylacrolein, alpha-cyclopentylacrolein, alpha-cyclohexylacrolein, alpha-phenethylacrolein, alpha-benzylacrolein, and their analogs and homologs are further exemplary alpha-methylene aldehydes which may be employed for the preparation of valuable 2,4-dienoic carboxylic acids according to the process of the invention without exceeding the generic concepts thereof. A preferred sub-group of alpha-methylene aldehydes comprises the alpha-methylene alkanals, i. e., acrolein and its alpha-alkyl substitution products, including acrolein, methacrolein, alpha-ethylacrolein, and homologous alpha-alkylacroleins. This preferred sub-group may be defined by the formula:

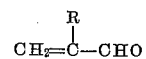

in which R represents a hydrogen atom or an alkyl group, preferably a lower alkyl group.

In lieu of ketene, the lowest member of the class, substituted, or homologous ketenes may be reacted with alpha-methylene aldehydes according to the invention. Methylketene, dimethylketene, diethylketene, propylketene, aryl ketenes, and cycloalkyl ketenes all are among the substituted ketenes included in the scope of the term "a ketene," used herein and in the claims.

In accordance with the invention, diolefinic carboxylic acids have been prepared by reacting ketene with an alpha-methylene aldehyde in the presence of a basic condensation catalyst. Although in accordance with the invention any suitable basic condensation catalyst may be employed, a preferred group comprises those condensation catalysts that are predominantly ionic in character and which have a basic reaction. This sub-group includes generically free bases, basic salts, and salts of strong alkalies with weak acids. It has been observed that the alpha-methylene aldehydes as a group frequently may have a strong tendency to undergo polymerization in the presence of an excessive amount of a strongly basic substance (e. g., a strong alkali). It is preferred, accordingly, to employ as the catalyst a suitable basic substance which does not cause excessive polymerization of the aldehyde but which still catalyzes the desired reaction between the ketene and the alpha-methylene aldehyde. It unexpectedly has been found that a group of especially desirable substances which may thus be employed as the condensation catalyst without causing excessive polymerization comprises the salts in which the cation is the cation of an alkali metal or alkaline earth metal, and the anion is the anion of a non-oxidizing weak acid, preferably the anion of a suitable carboxylic cid. Salts which impart to water a pH value greater than 7.0 and not over 11.0 are among the suitable catalysts. Preferred catalysts include the sodium and potassium salts of the lower members of the fatty acid series, such as potassium acetate, sodium acetate, potassium propionate, sodium propionate, the sodium and potassium formates, butyrates, etc., the acetates being preferred. In addition to the sodium and potassium salts, the preferred group also includes the corresponding lithium, rubidium, and even the caesium salts, and the corresponding salts of the alkaline-earth metals (barium, calcium, and strontium). Other basic condensation catalysts include, for example, sodium carbonate, potassium carbonate, basic potassium phosphate, basic sodium phosphate, calcium carbonate, strontium carbonate, barium carbonate, calcium oxide, barium oxide, sodium benzoate, sodium borate, potassium lactate, disodium tartrate, lithium benzoate, calcium benzoate, etc.

The desired reaction may be effected according to the invention simply by bringing the ketene and the alpha-methylene aldehyde into contact in the presence of the basic condensation catalyst while the mixture is maintained at a suitable temperature. The amount of the condensation catalyst is not highly critical and may be varied as desirable without exceeding the invention. In a preferred case the catalysts are those hereinbefore described catalysts that are substantially insoluble, i. e., only slightly soluble in the reaction mixture. In such cases, it generally suffices to have present an excess of the catalyst, that is, such an amount that the catalyst is present in part in the solid state. A generally suitable procedure for effecting the desired reaction comprises placing the alpha-methylene aldehyde in a suitable reaction vessel along with a suitable amount of the basic condensation catalyst, say from about 0.01 to about 20% by weight of the alpha-methylene aldehyde. Then while the mixture is kept well agitated (to obtain effective and thorough contact between the ketene and the aldehyde and the catalyst) gaseous or liquid ketene is passed into the mixture of the aldehyde and the catalyst at a rate approximately equal to the rate of its consumption in the reaction. During the addition of the ketene, the temperature of the mixture is kept within reasonable limits, as by means of cooling coils immersed in the mixture or by the use of a jacketed temperature-controlled reaction vessel, etc. Reaction temperatures as low as −40° C. or as high as +60° C. may be employed, a preferred range being from about −25° C. to about +30° C. The amount of ketene added desirably is limited to an amount about equimolar to the amount of the alpha-methylene aldehyde; however, the addition of larger amounts of ketene does no harm.

As indicated above, the ketene may be added either in the liquid or the gaseous state, although the addition of gaseous ketene may in general be more convenient because of the greater ease with which it may be handled, dispersed throughout the mixture, etc. Ketene obtained from any suitable source may be employed, as by the "cracking" or pyrolysis of acetone, of acetic acid, etc. Ketene obtained by the pyrolysis of acetone desirably is treated according to known methods to remove any undecomposed acetone prior to introduction into the reaction mixture; the methane that is formed in the pyrolysis need not be removed since it is inert with respect to the present reactants and under the conditions of execution of the process.

A suitable polymerization inhibitor may be included in the reaction mixture to assist in preventing the occurrence of polymerization. Suitable polymerization inhibitors include, for example, phenolic anti-oxidants, such as hydroquinone, tannic acid, resorcinol, naphtholamine, etc., amines, such as tertiary alkyl amines, etc. Amounts of the polymerization inhibitor from about 0.005% to about 5% by weight of the mixture may be employed. Larger or smaller amounts may be used if considered desirable. The presence of a polymerization inhibitor during treatment of the reaction mixture to recover the product serves to minimize polymerization during the operations. The reaction and the product recovery may, if desired, be effected under an atmosphere of an inert gas, such as nitrogen, methane, ethane, helium, etc., to reduce contact of atmospheric oxygen with the mixture. The reaction upon which the invention is based may be effected in the presence of an inert solvent, although the presence of a solvent is not necessary. The use of a solvent may be advantageous, as if it is desired to introduce the ketene into the reaction mixture in the form of a solution in a solvent. Instead of first mixing the alpha-methylene aldehyde and the condensation catalyst, a solution of ketene in a solvent and a solution of the aldehyde may be introduced simultaneously into a reaction zone wherein the catalyst is disposed. A further modification of the process which may provide particular advantages in the matter of yields of and conversion to the desired diolefinic carboxylic acid comprises passing the aldehyde, or a solution of the aldehyde over a bed of solid catalyst, in countercurrent relation to a stream of gaseous ketene brought into intimate and thorough contact with the liquid phase. A bed of a solid condensation catalyst thus may be disposed in a vertically positioned elongated reaction zone, and the alpha-methylene aldehyde in a liquid phase introduced slowly into the upper portion of the zone and allowed to flow downwardly over and through the bed of catalyst. At the same time, a gaseous stream of ketene may be introduced into the lower portion of the reaction zone and passed upwardly therethrough in contact with the liquid phase. Liquid effluent from the reaction zone is collected from the lower end and the desired diolefinic acid recovered therefrom.

Any suitable method may be employed for separating the desired carboxylic acid from the reaction mixture. The catalyst, if present in the solid state, may be removed by filtration, decantation, or other methods which will be obvious to those skilled in the art to which the invention pertains. If desired, any catalyst that is present in the mixture in dissolved form may be removed by extraction with a selective solvent, e. g., water. Such special treatment, however, ordinarily is not necessary when the more sparingly soluble catalysts are employed. The desired diolefinic acid then may be recovered from the liquid mixture by direct distillation, by extraction with selective solvents, by esterification with a lower alcohol and separation of the ester, by precipitation as an insoluble salt, or according to other suitable procedures.

The unsaturated acids produced by the process of the present invention are valuable intermediates for the production of organic chemicals, and they also may be employed as resin intermediates.

The following examples are presented to illustrate certain of the many possible specific em-

Example I

A solution of 84 grams of acrolein (containing 0.1% of hydroquinone) in 200 c. c. of diethyl ether was mixed with 10 grams of finely divided sodium acetate in a glass vessel and cooled to −30° C. Gaseous ketene was passed into the mixture at a rate greater than 13 grams per hour, for 4 hours. During the introduction of the ketene, the mixture in the vessel was kept well stirred and was maintained at a temperature of about −30° C. by partial immersion of the vessel in a cooling bath.

After addition of the ketene was complete, the mixture was filtered to remove the sodium acetate, and the filtrate was stripped under reduced pressure of low boiling components (mostly unreacted acrolein, and acetone). The residue, amounting to 128 grams, was neutralized at 0° C. by addition of a solution of NaOH in water. Three hundred cubic centimeters of chloroform were added to the mixture, and the mixture was made strongly acid by addition of 25% hydrochloric acid at 0° C. and with stirring. The chloroform layer was separated, and the aqueous portion was extracted twice with two 150 c. c. portions of chloroform. The chloroform solutions were combined, dried over anhydrous $Na_2SO_4$ and the chloroform was evaporated off. A portion of the residue was subjected to distillation under a pressure of 0.2 mm. mercury. Moist crystals of 2,4-pentadienoic acid collected on the cool upper portion of the flask. The crystals were collected, dried, and then resublimed. The resublimed crystals melted at 71° C. and were found to have the following analytical values:

|  | Found | Calculated for $C_5H_6O_2$ |
|---|---|---|
| Per cent carbon | 60.8 | 61.2 |
| Per cent hydrogen | 6.3 | 6.2 |
| Acidity, equivalents per 100 grams | 1.02 | 1.02 |

Example II

A mixture of 84 grams of acrolein (containing 0.1% of hydroquinone) and 10 grams of finely divided sodium acetate was placed in a reaction vessel. While the mixture was stirred vigorously, gaseous ketene was passed into the mixture for 2 hours at 10° C. to 20° C. The liquid portion of the mixture was decanted from the sodium acetate and ketene, acrolein, and acetone were removed under reduced pressure. The residue was washed with 150 c. c. of water and the organic portion remaining was distilled under 2 mm. mercury pressure. The distillate crystallized as it came over. The crystals were dissolved in warm petroleum ether–diethyl ether mixture (3:1 volume ratio) and 2,4-pentadienoic acid was crystallized from the solvent by cooling.

Other diolefinic carboxylic acids which may be prepared by reacting alpha-methylene aldehydes with ketene in the presence of a basic condensation catalyst include, for example, 3-methyl-2,4-pentadienoic acid from methacrolein and ketene, 3-ethyl-2,4-pentadienoic acid from alpha-ethylacrolein and ketene, 3-cyclohexyl-2,4-pentadienoic acid from alpha-cyclohexylacrolein and ketene, 3-isopropyl-2,4-pentadienoic acid from alpha-isopropylacrolein and ketene, and 3-phenethyl-2,4-pentadienoic acid from alpha-phenethylacrolein and ketene.

We claim as our invention:

1. A process for the production of 2,4-pentadienoic acid which comprises passing ketene into acrolein present in the liquid state in the presence of sodium acetate at a temperature within the range of from about −25° C. to about +30° C., and recovering 2,4-pentadienoic acid from the mixture.

2. A process for the production of 2,4-pentadienoic acid which comprises condensing acrolein in liquid phase with ketene in the presence of an alkali metal acetate at a temperaure within the range of from about −40° C. to about +60° C., and recovering 2,4-pentadienoic acid from the mixture.

3. A process for the production of a 2,4-pentadienoic acid which comprises condensing acrolein in liquid phase with a ketene in the presence of a basic condensation catalyst at a temperature within the range of from about −40° C. to about +60° C., to produce a 2,4-pentadienoic acid.

4. A process for the production of a 2,4-dienoic acid which comprises condensing in liquid phase a lower alpha-methylene alkanol with ketene in the presence of a basic condensation catalyst at a temperature within the range of from about −40° C. to about +60° C., and recovering a 2,4-pentadienoic acid from the mixture.

5. A process for the production of a 2,4-dienoic acid which comprises condensing in liquid phase a lower alpha-methylene alkanol with a ketene in the presence of a basic condensation catalyst at a temperature within the range of from about −40° C. to about +60° C. to produce a 2,4-pentadienoic acid.

6. A process for the production of a 2,4-dienoic acid which comprises condensing in liquid phase a lower alpha-methylene alkanol and a ketene in the presence of a basic condensation catalyst.

BRADFORD P. GEYER.
SEAVER A. BALLARD.

REFERENCES CITED

The following references are of record in the file of this patent:

Hurd et al., J. Am. Chem. Soc., vol. 55, pp. 275–283 (1933).

Williams et al., J. Am. Chem. Soc., vol. 62, pp. 2801–2803 (1940).

Adams et al., Organic Reactions, vol. 1, pp. 211–215, 241 (1942).

Certificate of Correction

Patent No. 2,515,595 — July 18, 1950

BRADFORD P. GEYER ET AL.

It is hereby certified that error appears in the printed specification of the above numbered patent requiring correction as follows:

Column 1, line 23, for the word "within" read *without*; column 6, lines 36, 43, and 50, for "alkanol" read *alkanal*;

and that the said Letters Patent should be read as corrected above, so that the same may conform to the record of the case in the Patent Office.

Signed and sealed this 31st day of October, A. D. 1950.

[SEAL]

THOMAS F. MURPHY,
*Assistant Commissioner of Patents.*